United States Patent
Lecomte et al.

(10) Patent No.: US 7,643,478 B2
(45) Date of Patent: Jan. 5, 2010

(54) SECURE AND PERSONALIZED BROADCASTING OF AUDIOVISUAL STREAMS BY A HYBRID UNICAST/MULTICAST SYSTEM

(75) Inventors: Daniel Lecomte, Paris (FR); Reda Hosny, Paris (FR); Mohammed Lamtouni, Clamart (FR)

(73) Assignee: Medialive SA (FR)

( * ) Notice: Subject to any disclaimer, the term of this patent is extended or adjusted under 35 U.S.C. 154(b) by 11 days.

(21) Appl. No.: 10/579,617

(22) PCT Filed: Nov. 24, 2004

(86) PCT No.: PCT/FR2004/050613

§ 371 (c)(1),
(2), (4) Date: Aug. 15, 2007

(87) PCT Pub. No.: WO2005/053299

PCT Pub. Date: Jun. 9, 2005

(65) Prior Publication Data

US 2008/0031326 A1      Feb. 7, 2008

(30) Foreign Application Priority Data

Nov. 24, 2003   (FR) .................................. 03 50895

(51) Int. Cl.
*H04L 12/56* (2006.01)
*H04N 7/167* (2006.01)

(52) U.S. Cl. .................... 370/389; 360/60; 380/201; 386/94

(58) Field of Classification Search ........................ None
See application file for complete search history.

(56) References Cited

U.S. PATENT DOCUMENTS

| | | | |
|---|---|---|---|
| 5,590,199 A * | 12/1996 | Krajewski et al. ............ | 713/159 |
| 6,091,769 A * | 7/2000 | Moon .......................... | 375/240 |
| 6,295,361 B1 | 9/2001 | Kadansky et al. | |
| 6,539,022 B1 | 3/2003 | Virgile | |
| 6,886,040 B1 * | 4/2005 | Fitzgerald .................... | 709/224 |
| 7,058,809 B2 * | 6/2006 | White et al. ................. | 713/176 |
| 7,382,969 B2 * | 6/2008 | Dawson ....................... | 386/94 |
| 2003/0210789 A1* | 11/2003 | Farnham et al. ............. | 380/270 |
| 2004/0168185 A1* | 8/2004 | Dawson et al. ................ | 725/38 |
| 2006/0075135 A1* | 4/2006 | Rambhia ..................... | 709/238 |

FOREIGN PATENT DOCUMENTS

| | | |
|---|---|---|
| EP | 1 093 249 A2 | 4/2001 |
| WO | WO 01/67667 A1 | 9/2001 |
| WO | WO 02/11356 A2 | 2/2002 |
| WO | WO 02/45334 A1 | 6/2002 |
| WO | WO 02/062054 A2 | 8/2002 |
| WO | WO 03/063445 A1 | 7/2003 |

* cited by examiner

*Primary Examiner*—Hong Cho
*Assistant Examiner*—Robert C Scheibel
(74) *Attorney, Agent, or Firm*—DLA Piper LLP (US)

(57) ABSTRACT

A process for secure distribution of digital audiovisual streams according to a standard, normalized or proprietary format including separating an original stream into two parts, transmitting the parts to addressee equipment, generating a modified main stream having a format of the original stream and complementary information with any format including digital information suitable to permit reconstruction of the original stream, and transmitting the modified stream from a distribution server via separate paths during distribution in an extended, secure multicasting mode to the addressee equipment from a secure central server passing via at least one router and at least one switch connecting the addressee equipment to the central server via at least one access point.

10 Claims, 1 Drawing Sheet

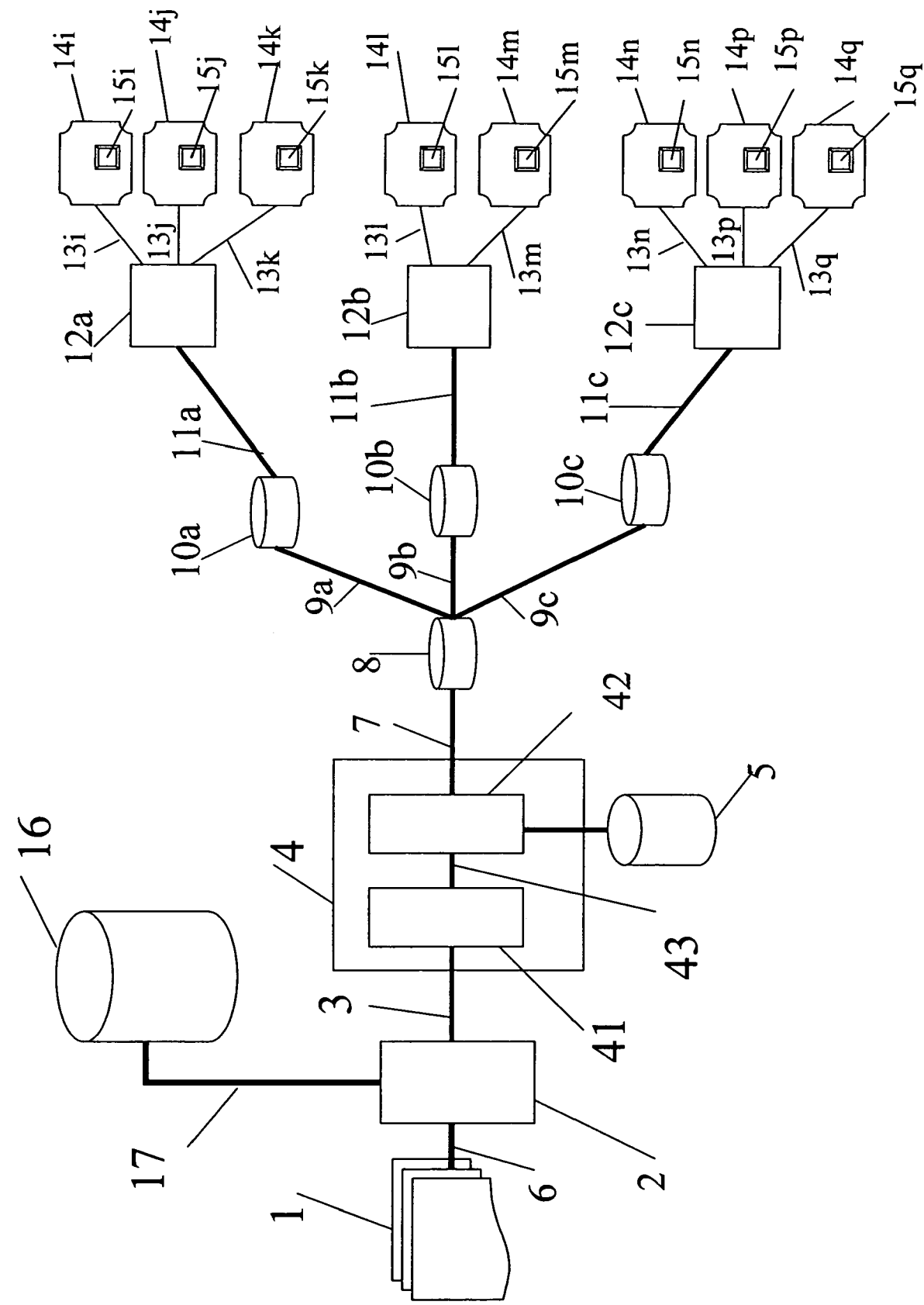

SECURE AND PERSONALIZED BROADCASTING OF AUDIOVISUAL STREAMS BY A HYBRID UNICAST/MULTICAST SYSTEM

RELATED APPLICATIONS

This is a §371 of International Application No. PCT/FR2004/050613, with an international filing date of Nov. 24, 2004 (WO 2005/053299, published Jun. 9, 2005), which is based on French Patent Application No. 03/50895, filed Nov. 24, 2003.

TECHNICAL FIELD

This disclosure relates to the area of the broadcasting of digital audiovisual sequences.

BACKGROUND

It is currently possible to transmit audiovisual programs in digital form via broadcasting networks of the microwave (herzian), cable, satellite type, etc. or via telecommunication networks of the DSL type (Digital Subscriber Line) or BLA type of (Local Radio Loop) or via DAB networks (Digital Audio Broadcasting) as well as via any wireless telecommunication network of the GSM (Global System for Mobile), GPRS (General Packet Radio Service), UMTS (Universal Mobile Telecommunication System), Bluetooth, WiFi types, etc. Moreover, to avoid the pirating of works broadcast in this manner these works are frequently encrypted or scrambled by various known means.

U.S. Pat. No. 6,295,361 discloses a method and device that permit a key management node to decide the process for changing the group key of certain nodes in a multicasting group with the aid of an indicator inserted into a multicast packet. The management node decides how to insert the indicator and which nodes are concerned. The new key is then sent and when all the nodes of the group have received their key, the management node sends an indicator or also a date from which all the members of the group are authorized to use the new keys. Thus, a method for managing the multicast session with the aid of dynamic changing of the group keys is disclosed. The same key is attributed to all the members of the same group with the aid of which the data is decrypted. However, the protection used is the encryption and all the data initially present in the audiovisual stream remain in the protected stream. Consequently, U.S. Pat. No. '361 does not resolve the problem of high security and personalization.

WO 02/11356 A2 discloses a method for managing keys between the client and the server in a multicast environment. The method is based on establishing a secure channel between the server and the client using an SSL protocol (Secure Socket Layer) or TLS (Transport Layer Security) with certain modifications of the order of exchanging of messages to be able to generate a management key and send the key to the client via the secure channel, from which key the client generates a future key for the session with the server. The clients of one and the same multicasting group use the same management key for generating a session key during the communication session. WO '356 does not correspond to the criteria for the secure transport of audiovisual data and the data, even the encrypted data, is integrally present in the protected data stream.

SUMMARY

This invention relates to a process for secure distribution of digital audiovisual streams according to a standard, normalized or proprietary format including separating an original stream into two parts, transmitting the parts to addressee equipment, generating a modified main stream having a format of the original stream and complementary information with any format including digital information suitable to permit reconstruction of the original stream, transmitting the modified main stream from a distribution server via separate paths during distribution in an extended, secure multicasting mode to the addressee equipment from a secure central server passing via at least one router and at least one switch connecting the addressee equipment to the central server via at least one access point.

This invention also relates to a system for the secure distribution of audiovisual streams including a device for separating an original video stream into a modified main stream and into complementary information, at least one multimedia server containing the audiovisual streams, at least one secure central server including a device for securing and personalizing the complementary information from which the complementary information is distributed, at least one telecommunication network, at least one router, at least one switch functioning as an access point for connection to addressee equipment and a device in the addressee equipment for reconstruction of the original audiovisual stream as a function of the modified main stream and the complementary information.

BRIEF DESCRIPTION OF THE DRAWING

The drawing is a diagram showing in block form selected aspects of a system broadcasting system.

DETAILED DESCRIPTION

This disclosure provides a process and a system that permit the visual and/or auditory protecting of an audiovisual sequence stemming from a digital standard, a digital norm or a proprietary standard, its distribution in a secure manner in multicasting mode via a telecommunication network, and the reconstituting of its original content on a recomposition module of the addressed equipment from a protected digital audiovisual stream.

A device is disclosed that is capable of transmitting a set of high-quality audiovisual streams in a secure manner via a telecommunication network to a viewing screen and/or to an audio output belonging to a terminal or display device such as a television screen, a computer or a mobile terminal such as a telephone or PDA (Personal Digital Assistant), or the like while preserving the audiovisual quality but avoiding any fraudulent use such as the possibility of making pirated copies of the broadcast contents. A process is also disclosed as is a client-server system that protects the audiovisual contents by separating them into two parts, the second part of which is indispensable for reconstitution of the original stream, the latter being restored as a function of the recombination of the first part with the second part.

The process used for the description of a preferred example separates the audiovisual stream into two parts in such a manner that the first part, called "modified main stream,"

contains the quasi totality of the initial information, for example, more than about 99%, and a second part, called "complementary information," containing targeted elements of the initial information and which is of a very small size compared to the first part. The complementary information contains data extracted from the original stream, which extracted data is replaced by "decoys" in the modified main stream in such a manner as to cause a severe audiovisual degradation while keeping this main stream protected in conformity with the norm or standard of the original stream.

This disclosure provides a system characterized by the multicast broadcasting of complementary information and processing is carried out in real time on segments representing entities that are independent as regards the processing, which segments comprise data for the reconstruction of complete audiovisual information and are secured and personalized for each user and sent to the equipment of the addressees in real time via a low-bandwidth network from a central server functioning as access controller for the viewing of the contents.

The term "multicast" denotes a manner of transmitting from a sender to all the receivers belonging to the same group of subscribers in contrast to the term "unicast", that represents a manner of transmitting from a sender to a single receiver.

The protection applied to contents distributed by the secure multicasting system is based on the principle of deleting and replacing certain information present in the original encoded audiovisual signal by any method, e.g., substitution, modification, permutation or shifting of the information. The solution includes extracting and permanently preserving in a secure server the complementary information containing a part of the original audiovisual stream, which part is indispensable for reconstituting the audiovisual program, but has a very small volume relative to the total volume of the audiovisual program recorded at the user's or received in real time by this user. The complementary information is transmitted in multicasting mode via the secure transmitting network at the moment of viewing and/or hearing of the audiovisual program.

The fact of having removed and substituted by decoys a part of the original data of the initial audiovisual stream during generation of the modified main stream does not permit restitution of the original stream from the modified main stream, that is entirely compatible with the format of the original stream and can therefore be copied and read by a classic reader. The modified main stream is, however, completely incoherent from the viewpoint of human auto visual perception.

As the original digital stream is separated into two parts, the largest part of the audiovisual stream, the modified main stream may therefore be transmitted via a classic broadcasting network whereas the lacking part, the complementary information, may be sent on demand via a narrow-band telecommunication network or via a physical support such as a memory card, disk, etc. However, the two networks can be combined while keeping the two transmission paths separate. For reconstitution of the original stream, the complementary information is sent piece by piece during viewing and/or listening to the audiovisual stream.

The subject matter of this disclosure is the secure and personalized transmission, after authentication of the user, of the complementary information in multicasting mode in such a manner as to avoid it from being able to be copied or fall entirely into the possession of the user or of any ill-disposed person.

Multicast distribution is used in the instances in which a large number of users wish to access the same content at the same time, which is, e.g., the case for direct broadcasting by satellite or cable or via any other network that allows several subscribers to be accessed at the same time. The content stream is transmitted from a server to the clients via a multicasting channel. The complementary information designated and personalized for each active client (member of the multicasting group) is broadcast by a separate path from a secure server also in multicasting. The user who is interested in a content joins the multicasting group, receives the complementary information as a function of the user's rights, which thus allows reconstitution of the original stream and therefore simultaneously viewing with the reception of the complementary information.

On the one hand, the benefit of the distributing in multicasting mode of the complementary information is that a central server can model its distribution to a very large number of consumers. On the other hand, the disadvantage of distributing in multicasting is that the same complementary information is transmitted to all the users in the group and, as a consequence, it is more difficult to individually control the different consumers.

From the standpoint of security and content protection, multitasking has the disadvantages of the models "one-to-many" or "a single sender, several receivers" from the expression "one-to-many" that designates a communication operation from a single sender and directed to multiple receivers. This creates the necessity of working out a protection system for reliable multicasting distribution based on the following characteristics:

the solution is complementary to the multicasting distribution protocol "join/leave the group" that is well-known.

making the decision to join/leave the group is performed at the level of the access elements of the network for access control from a previously established list where the client receives permission to join the group, but does not have the right at that stage to view the stream broadcast for the group, which access elements are called "switches."

users for which a switch refused authorization cannot join the group.

the central server is responsible for updating the client list and making the decision to include new identities in the list of encryption keys for the session after a first stage of authentication with the client desiring to join the group.

each session key is individual for each client and has its own lifetime, after which it is considered as a non-valid key and then destroyed by the server.

the scale of a multicasting group is on the order of several thousand users per group.

the relation is of the one-to-all type in a single direction. Consequently, the server is the emission source and the clients are the receivers with the exception of requests emitted from the receivers to the server via a unicasting return link or, e.g., during the authentication stage.

The particularity is that the server broadcasts in multicasting to a large number of users that can join and leave the group in a dynamic manner. Furthermore, the functionality of the selective relation ("push relation") is eliminated, that is, the clients of one and the same group can not communicate with each other and, as a consequence, the model of the multicasting connection is simplified, as well as the protocol for the management and distribution of keys for the members of the group.

Thus, one aspect is a simplified protocol for secure broadcasting of the complementary information in multicasting, thus completing the existing multicasting broadcasts protocols with a secure broadcasting protocol of the complementary information.

To this end, the process according to a general meaning includes secure distribution of digital audiovisual streams according to a standard, normalized or proprietary format, in which streams a separation of the stream into two parts is made prior to the transmission to the addressee's equipment to generate a modified main stream with the format of the original stream and to generate complementary information with any format comprising the digital information suitable for permitting the reconstruction of the original stream, wherein the modified main stream is transmitted from a distribution server via separate paths during the distribution phase and the complementary information is transmitted in multicasting mode to the addressee's equipment from a secure central server passing via at least one router and at least one switch connecting the addressee's equipment to the central server via at least one access point.

Authentication between the client and the server is preferably performed in unicast mode. A session key that is unique by content and by client may be generated by the central server following authentication. The complementary information is advantageously compressed and encrypted prior to being sent to the client.

Management of a multicasting group may be performed in the connection layer controlling the distribution of data in multicasting solely for the access point concerned. Managing and securing the complementary information is preferably performed following a multi-reception of the requests for authentication by a central server and comprises a compression stage, and encryption stage and a management stage of said session keys.

Regeneration of a new session key for the client may be performed as a function of the decision of the client to prolong the connection, is based on the lifetime of the preceding session key and is individual for each member of the multicasting group.

The complementary information may also be secured and personalized for each client and each multicasting session with the aid of methods of hybrid or symmetric or asymmetric encryption.

The system for the secure distribution of audiovisual streams may include the control of the throughput in the multicasting group and is performed as a consequence of the managing and personalizing of the securing of the complementary information.

The system preferably comprises a device for separating the original video stream into a modified main stream and complementary information, at least one multimedia server containing the protected audiovisual streams, at least one secure central server comprising a device for securing and personalizing the complementary information from which the complementary information is distributed, at least one telecommunication network, at least one router, at least one switch functioning as access point for the connection to the addressee's equipment and a device in the addressee's equipment for reconstruction of the original audiovisual stream as a function of the modified main stream and of the complementary information.

The process and system will be better understood with the aid of selected exemplary embodiments and the following detailed stages. A preferred, but non-limiting exemplary embodiment of the process that responds to the criteria of security and reliability is illustrated by the client-server system presented in the figure.

The auto visual stream in digital form 1 transmitted via link 6 to analysis and scrambling module 2 is separated into two parts by module 2. Modified main stream 17 is stored in multimedia server 16 and sent in real time to the client during viewing via a broadband network or is stored in advance on the backup device of terminal 14 of the user. Complementary information 3 is sent to storage and segmentation module 41 of secure central server 4.

Since the complementary information is sent solely on demand, its distribution in real time, its securing and its personalizing for each user is realized by virtue of the property of "scalability in throughput" on the transport networks. The notion of "scalability in throughput" is defined as the capacity of a network to manage, modify, allocate and adapt the throughput of the transiting streams as a function of the bandwidth that is available or negotiated and as a function of network congestion. As a result of the low throughput of the complementary information transmitted in real time, the process contains a segmentation stage of the complementary information in module 41, which generates data segments of variable size with each segment corresponding to an entire, subjectively coherent audiovisual element such as an image or a frame, a group of images or GOP ("Group Of Pictures") in an MPEG-2 stream for example. In another aspects, the segmentation is performed in a single stage after generation of the complementary information 3 and produces a series of segments designated as a "stream of complementary information" that remain stored in storage and segmentation module 41. In yet another aspect, the stream of complementary information is generated in real time.

The segmentation stage of the complementary information is followed by a stage of encapsulation of blocks of data and an encryption stage in module 42 preceded by a stage of compressing their size in which the blocks remain available on demand by the users. The stream of complementary information is continuously sent to terminal 14 of the user in the form of blocks with a block containing a segment to which access information or "header" was added comprising data relative to the identity of the user in the case of a classic centralized network. The header preferably comprises data relative to the mobility of the user (position, rights, network access points, for example) in the case of a distributed network. The header advantageously comprises data relative to the encryption keys of the stream of complementary information. A block is the fundamental unit of communication and is also called UFIC ("Unite de Flux d'Information Complementaire"="Unit of Stream of Complementary Information").

When the user "i" wishes to view a sequence the user connects via equipment 14*i* and link 13*i* to a closest access point, switch 12*a*, that previously gave authorization to join the multicasting group. Switch 12*a* redirects the request via a link 11 to local router 10*a*, which latter for its part directs the request via link 9*a* to central router 8, which central router 8 addresses central server 4 via link 7. When server 4 thus receives the request of client 14*i*, central server 4 requires an authentication from the client 14*i* to make a decision about sending the UFIC's requested, that are unique as an audiovisual sequence. After the authentication dialog, identification of the client 14*i* by central server 4 that the client is in its database 5, and the generation of a unique session key, the stream segmented in module 41 is sent via link 43 to module 42, compressed and encrypted in the module 42 by the unique session key by heading and by client. The UFIC's are then transported via link 7, central router 8, link 9*a*, local router 10*a*, link 11*a*, switch 12*a* and link 13*i* to terminal 14*i* of the user i. Terminal 14*i* of the user is advantageously equipped with a smart card 15*i* on which the description of the units of the stream of complementary information is performed.

Switch 12*a* is responsible for security and controls the addresses of the clients in the access list composed of information relative to the previous sessions with the client (e.g., time and duration of connection, anticipated or delayed payment, type of contents viewed), which assures personalizing of each client session and therefore the complementary information by forming UFIC units. One way is the use of a hybrid method such as, e.g., using unicasting for authentication with the aid of secure keys and multicasting for the broadcasting of the complementary information.

First, if the client 14*i* succeeds in joining the multicasting group desired via switch 12*a*, it is because the client has a recognized identity and an authorization from the network to receive packets of complementary information after the authentication stage. However, if no valid session key was generated by the central server, the client can not use the UFIC's, which UFIC's are broadcast and encrypted solely with the keys of the other users 14*j*, 14*k*, or the like.

Second, the client communicates with the server of complementary information 4 in a point-to-point link in unicasting and the authentication phase is thus performed to assure that the client has sufficient rights for receiving the UFIC's and generating the session key (via a secure method of exchange of information) and the viewing rights are backed up in a database for managing rights 5.

At the end of this, stage server 4 automatically adds the new key of client 14*i* into the list of session keys corresponding to the multicasting group requested.

Server 4 begins to encrypt the current UFIC with the session key and sends the UFIC with what is called "a label" that is delivered to the client during the authentication stage. This label contains the information about a unique association between the encrypted UFIC and each client. Client 14*i* receives groups of packets and retains the valid label and decrypts the data portions with the session key until the lifetime of this session key expires.

After a period that is sufficiently long to have the right to request a new key and in the instance in which the client desires to continue receiving the complementary information of the same multicasting group, a new authentication stage recommences.

Server 4 advantageously encrypts the UFIC's corresponding to a simultaneous broadcasting of the same content with the session keys of all authorized clients 14*i*, 14*j*, 14*k*, . . . , 14*q* and sends the same encrypted UFIC a certain number of times with each key different, corresponding to the numbers of clients connected.

Compression of the units of streams of complementary information is preferably applied prior to encryption with all the session keys, which reduces the volume of information to be transported and also increases the security of the encrypted UFIC's as a consequence by reducing the redundancy because many cryptographic analyses exploit redundancy to break the protection. The efficacy of the compression is also one of the factors that manages the throughput scalability of the multicasting group as a function of the number of members per group.

Each user decrypts the UFIC's received with the aide of each user's session key.

The term "transmission cycle of the server" denotes the stage of sending a UFIC in compressed form, encrypted with all the keys of the members of the group to the address and the port number of the multicasting group. An advantage of this technique is that it assures resistance to pirating due to the fact that multiple encryption of the same content is applied with different keys for the different addressed equipments. The compression mechanism is applied to the transmission cycle of the server to avoid a traffic that is too high for the groups with a large number of members (several thousand users). This model is suitable for being used for any lossless compression algorithm of the LZ (Lempel-Ziv) type, e.g., LZW (a variant of LZ by Terry Welsch), LZJH (Lempel-Ziv-Jeff-Heath or v.44 by ITU-T) and the like.

Periodic renewals of the session keys are made to assure their cryptographic security. For example, a session key can be valid for a period of two hours, during which the key deciphers a quantity of UFIC's with a throughput of a dozen of kbits/s equal, e.g., to $2^{20}$ data blocks, each with a length of 64 bits.

An extension of the function of observing messages of the multicasting group ("snooping") with the IGMP (Internet Group Management Protocol) protocol at the last distribution point 12 is used in the connection layer for access management (authorize or prohibit) for each client on the streams for which this client has or does not have rights and, as a consequence, optimizes the bandwidth for each client at the client's access point such as, e.g., a DSLAM (Digital Subscriber Line Access Multiplexer) of a DSL (Digital Subscriber Line) network. This extension of the observation function thus adds an extended and secure mode of multitasking transmission. This complementary information is thus transmitted during the distribution phase in an extended and secure mode of multitasking transmission to the addressee's equipment from a secure central server passing through at least one router and at least one switch connecting the addressee's equipment to the central server via at least one access point. The system keeps the personalization of the UFIC's for each client while reducing the number of unicasting connections per server with the exception of moments of authentication. The system also optimizes the throughput, therefore, the quantity of data to be transmitted as a function of the variation of the number of clients per group. Thus, the access management and personalization of the complementary information "UFIC" control the throughput in the multicasting group. The current version of the IGMP protocol allows switches 12 to detect the IGMP messages of the member clients, to send the respective response and control the distribution of packets in multitasking up to the port of the client. This function is completed by a filtering relative to the first control level with a list of addresses of the MAC (Medium Access Control) connecting layer, which addresses represent the clients authorized to connect to the multicasting group.

Furthermore, a marking with a label is added for each compressed and encrypted data packet that represents the identity of the client and also a second level of control and personalization.

This identity is used by switch 12 to determine the physical port to which the packets are distributed by sending the client in question only the packets marked with the client's own label.

The UFIC's may be encrypted with the aid of symmetric encryption algorithms and the encryption key may then be encrypted with a public key of the addressee. This is a hybrid authentication mode. The UFIC's may also be encrypted with the aid of asymmetric encryption algorithms and this is a PKI ("Public Key Infrastructure") authentication mode.

The process will be illustrated with the aide of a second example that includes a multicasting protocol, a mutual authentication method and a compression method for the server comprising multicasting protocols used and their extension for the distribution of the complementary information.

The multicasting transmission system is based on a group management protocol (IGMP) that is responsible for the control for joining/leaving the multicasting group. This protocol is executed between the client 14*i*, 14*j*, 14*k* and the closest network access point, switch 12*a*. A multi-casting routing protocol controls the routing of the multicasting traffic from switches 12 to all routers 10 of the distribution network.

A control processor located in switch 12 observes the IGMP messages sent by clients 14. The switches capable of managing and emulating IGMP messages also use this information for dynamically configuring their own observation filters.

This solution optimizes management of the bandwidth at the level of the switches, avoiding an overloading of the LAN's ("Local Area Network"), in particular in the instances in which the final user switches frequently from one multicasting group to another one, e.g., when changing a television channel.

Routers 10 supporting multicasting routing, and switches 12 for which layer 3 of the OSI model is capable of managing the data used for this example, contain a bandwidth control with a functionality of limiting throughput in IP multicasting that allows an upper limit to be imposed for the traffic carried out from the server to the multicasting groups. The mechanism for defining the limits includes the definition of a multicasting source filter and a multicasting group receiving filter per reception port. This control filter is based on the IP address or also on the Mac address (address of the network card "Medium Access Control") using, e.g., the MVR (Multicast VLAN Registration) mechanism, and as a consequence in order to avoid a fraudulent attribution ("spoofing") of the IP network address of the client a complementary protocol is applied in unicast "Unicast Reverse Path Forwarding" (URPF) between client 14 and switch 12.

The invention claimed is:

1. A process for secure distribution of digital audiovisual streams according to a standard, normalized or proprietary format comprising:
   separating an original encoded audiovisual stream into two parts;
   transmitting the parts to addressee equipment;
   generating a modified main stream having a format of the original encoded audiovisual stream and complementary information with any format comprising digital information suitable to permit reconstruction of the original encoded audiovisual stream by deleting and replacing, directly on a compressed bitstream, domain information segments of the original encoded audiovisual stream, wherein the complementary information comprises the replaced information segments of the original encoded audiovisual stream; and
   transmitting via separate paths:
     the modified main stream in a broadcasting mode; and
     the complementary information in an extended, secure multicasting mode to the addressee equipment from a secure central server passing via at least one router and at least one switch connecting the addressee equipment to the central server via at least one access point, wherein the secure multicasting mode enables in-band transmission of information relative to digital rights management.

2. The process according to claim 1, wherein authentication between a client and the server is performed in unicast mode.

3. The process according to claim 2, further comprising generating a session key that is unique by content and by client by the central server following the authentication.

4. The process according to claim 3, wherein the complementary information is compressed and encrypted prior to being sent to a client.

5. The process according to claim 1, further comprising performing management of a multicasting group in a connection layer controlling distribution of data in multicasting solely for a selected access point.

6. The process according to claim 1, wherein managing and securing of the complementary information is performed following a multi-reception of requests for authentication by a central server and comprises compression, encryption and management of session keys.

7. The process according to claim 1, wherein regeneration of a new session key for the client is performed as a function of a decision of a client to prolong a connection based on the lifetime of a preceding session key and is individual for each member of a multicasting group.

8. The process according to claim 1, wherein the complementary information is secured and personalized for each client and for each multicasting session with the aid of methods of hybrid or symmetric or asymmetric encryption.

9. A system for the secure distribution of audiovisual streams comprising a device for separating an original encoded video stream into a modified main stream and into complementary information by deleting and replacing, directly on a compressed bitstream, domain information segments of the original encoded video stream, at least one multimedia server containing the audiovisual streams, at least one secure central server comprising a device for securing and personalizing the complementary information from which the complementary information is distributed, at least one telecommunication network, at least one router, at least one switch functioning as an access point for connection to addressee equipment and a device in the addressee equipment for reconstruction of the original audiovisual stream as a function of the modified main stream and the complementary information, wherein the complementary information comprises the replaced information segments of the original encoded audiovisual stream, wherein the complementary information is transmitted in an extended, secure multicasting mode that enables in-band transmission of information relative to digital rights management, and wherein the modified main stream is transmitted in a broadcasting mode.

10. The system according to claim 9, wherein control of throughput in a multi-casting group is performed as a consequence of managing and personalizing of securing of the complementary information.

* * * * *